March 21, 1939.  W. F. OHME ET AL  2,151,437
MACHINE FOR WASHING DRINKING VESSELS
Filed Aug. 23, 1934  3 Sheets-Sheet 1

Inventor
Walter F. Ohme and
Ray C. Stephan
By Caswell & Lagaard
Attorneys

March 21, 1939. W. F. OHME ET AL 2,151,437
MACHINE FOR WASHING DRINKING VESSELS
Filed Aug. 23, 1934 3 Sheets-Sheet 3

Inventor
Walter F. Ohme and
Ray C. Stephan
By Caswell & Lagaard
Attorneys

Patented Mar. 21, 1939

2,151,437

UNITED STATES PATENT OFFICE 2,151,437

MACHINE FOR WASHING DRINKING VESSELS

Walter F. Ohme and Ray C. Stephan, Minneapolis, Minn., assignors to North Star Specialty & Manufacturing Company, Minneapolis, Minn., a corporation of Minnesota Application August 23, 1934, Serial No. 741,078

7 Claims. (Cl. 141—3)

Our invention relates to machines for washing drinking vessels and particularly to machines for washing drinking glasses.

An object of the invention resides in providing a machine in which the glasses may be washed by means of sprays and without manual manipulation.

Another object of the invention resides in providing a revoluble rack for supporting the glasses movable past fixed sprays and in the particular construction for rotatably supporting the rack.

A feature of the invention resides in the construction of the motor and transmission mechanism used for driving the rack.

An object of the invention resides in the arrangement of and in the construction of the water motor of the invention and the transmission mechanism so as to minimize the space used and so as to permit of installing the same below the rack.

A still further object of the invention resides in constructing the transmission so that the motion of the rack may be arrested without injuring the motor or transmission mechanism.

Other objects of the invention reside in the combination of parts and in the details of construction hereinafter illustrated and/or described.

Figure 1:
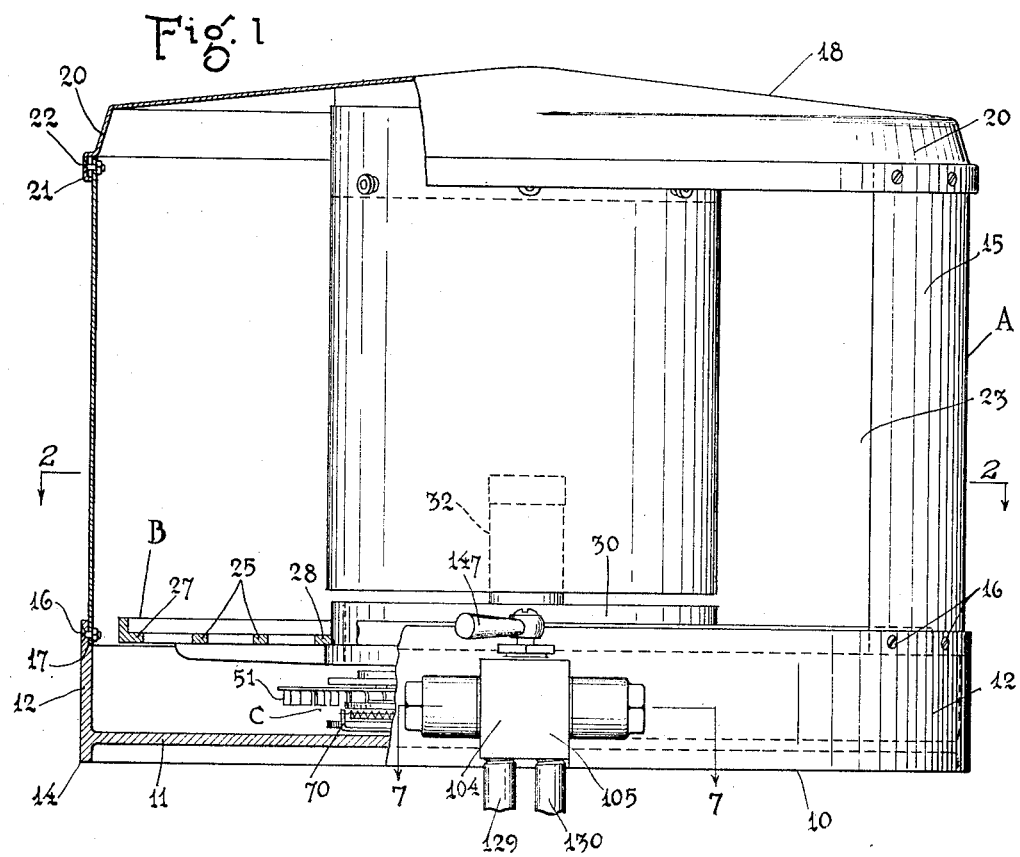
Fig. 1 is an elevational view of a machine for washing drinking glasses illustrating an embodiment of our invention with parts thereof cut away to show the internal construction of the machine.

Our invention comprises a housing which we have indicated in its entirety by the reference character A and in which the washing mechanism of the invention is installed. The washing mechanism of the invention comprises a revoluble rack B which is driven through a water motor C. A series of sprays to be later described, spray hot and cold water on glasses carried by the rack as the rack is rotated past said sprays. These various parts will now be described in detail.

The housing A consists of a tray 10 circular in form which is constructed with a bottom 11 having a rim 12 extending upwardly therefrom. The bottom 11 is preferably sloping toward the forward portion of the tray where a drain 13 is provided by means of which the water discharged into the housing may be removed from the device. At the outer margin of the bottom 11 is provided a ledge 14 which elevates the bottom 11 above the surface on which the machine rests. This ledge may, if desired, be formed in continuation of the rim 12 of said tray. The tray 10 is constructed as a casting or the same may be spun from sheet metal or constructed in any other suitable manner. The housing A further comprises a semi-circular wall 15, which is secured to the rim of the tray 10 and extends upwardly therefrom. The lower edge of this wall rests in a recess 17 formed in said rim. The wall 15 is preferably attached to said rim through small bolts 16 which pass through suitable openings in both said rim and wall. Upon the upper end of the wall 15 is placed a cover or closure 18 which is circular throughout the extent thereof. This closure is provided with a flange 20 which extends downwardly therefrom and which terminates at its lower end in a lip 21 by means of which the closure may be secured to the wall 15. This is accomplished through bolts 22 which pass jointly through said wall and lip the same as the bolts 16. By means of the particular construction employed, an opening 23 is provided at the front of the housing through which access may be had to the interior thereof and to the glasses placed upon the rack B mounted therein.

The rack B consists of a table 24 which is constructed with a number of circularly disposed concentrically arranged rings 25, 27 and 28. These rings are connected together through radially extending bars 26 to form a reticulate structure on which the glasses or other dishes to be washed may be placed. The rings 25, 27 and 28 and the bars 26 all lie in a common horizontal plane so as to form a suitable support for the glasses. The outer ring 27 is provided with an upwardly extending flange 29 by means of which the glasses are held upon the rack.

The table 24 is rotatably supported on a spider 31 which comprises a central tubular hub 32 connected to a circular flange 30 through radially extending arms 33. The hub of this spider has mounted in it ball bearings 34 and 35 which are disposed at the upper and lower ends thereof. In the center of the bottom 11 of tray 10 is provided a boss 36 which has secured to it through a set screw 37 an upwardly extending post 38. Post 38 is turned to receive the inner races of the two bearings 34 and 35. By means of the two bearings 34 and 35 the spider 31 is rotatably mounted. A cap 39 secured to the upper end of the hub 32 covers the bearing 34 and prevents the entry of water into said bearings from above. The table 24 rests upon the projecting ends of the arms 33 of spider 31 and is centered with respect to the axis thereof through the flange 30.

The flange 30 similar to flange 29 extends upwardly above the surface of the table 24 to hold articles positioned thereon in place. To further serve this purpose a guard 229 is employed which is constructed from sheet metal bent in cylindrical form with a curvature substantially equal to the curvature of the flange 30. This guard is bolted to a mounting 230 by means of bolts 231 and may be easily removed when access into the interior of the machine is desired. Mounting 230 may be soldered or otherwise secured to the cover 18.

Figure 2:
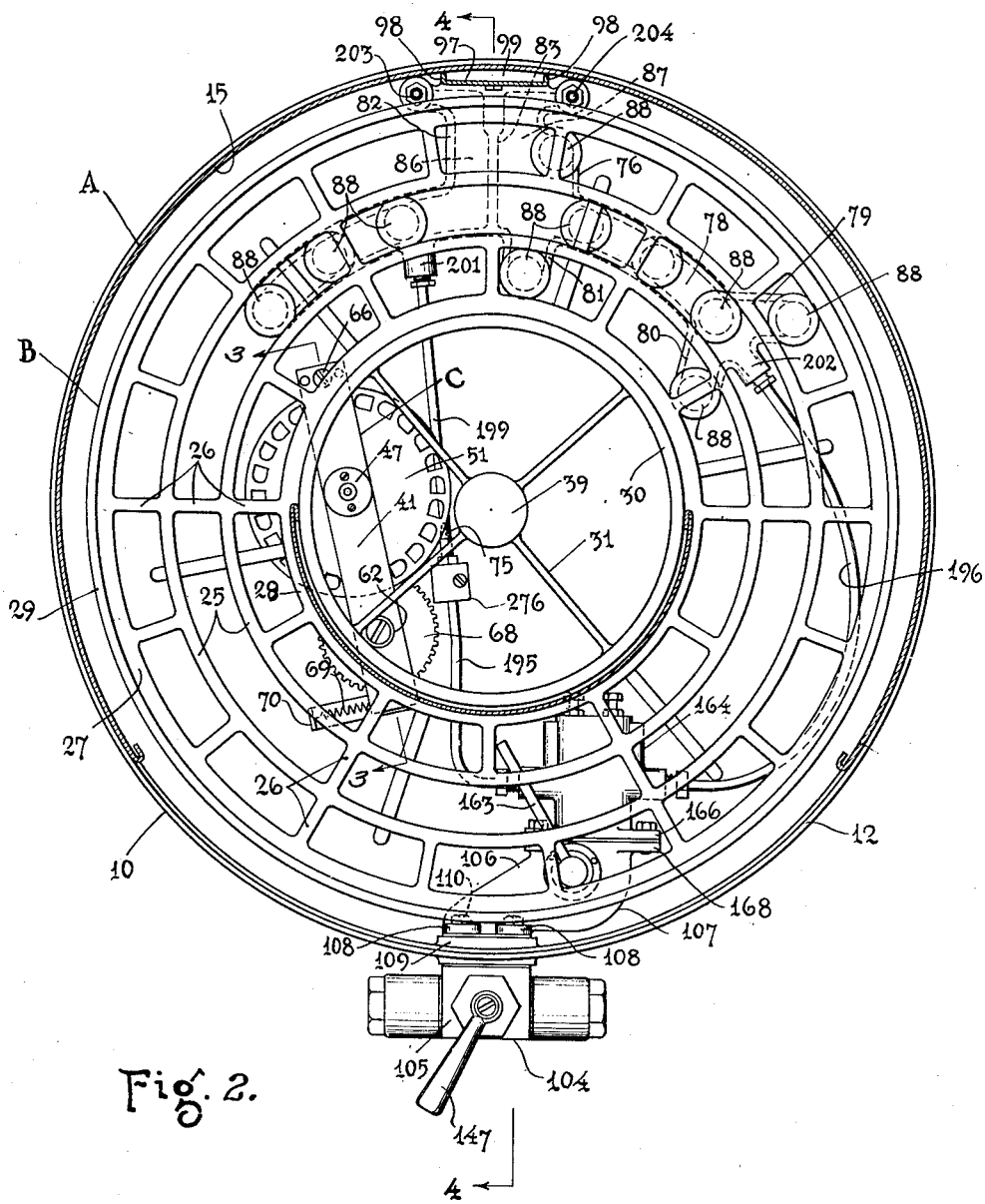
Fig. 2 is a plan sectional view taken on line 2—2 of Fig. 1.
Figure 3:
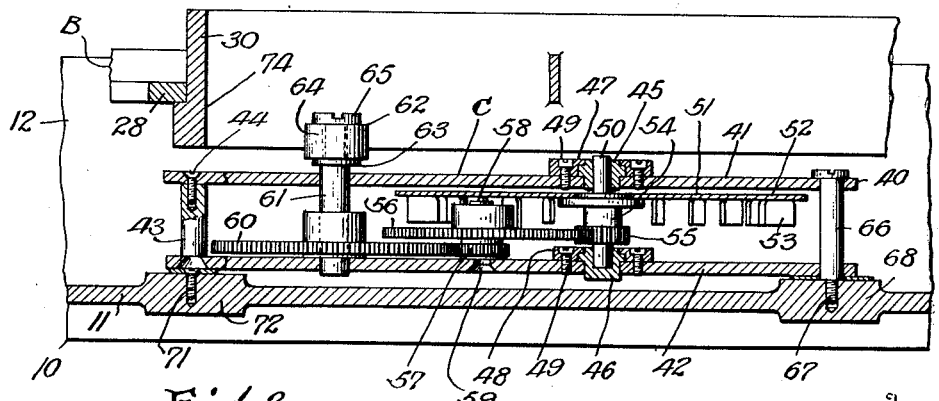
Fig. 3 is a fragmentary elevational sectional view taken on line 3—3 of Fig. 2.

The water motor C and the power transmission associated therewith are illustrated in detail in Figs. 2 and 3. This part of the invention includes a frame 40 which comprises two spaced parallel bearing plates 41 and 42 held in spaced relation through posts 43. These posts are riveted to the plate 42 and the plate 41 is secured to said posts through screws 44 threaded into said posts. In the two plates 41 and 42 are mounted two self lubricating bearings 45 and 46 which are attached to the said plates through retaining rings 47 and 48 secured to said plates through screws 49. In the bearings 45 and 46 is rotatably mounted a shaft 50. Shaft 50 has attached to it a water wheel 51. This wheel is constructed from a sheet of metal which is arranged to form a back 52 and which is cut at its outer periphery to provide a plurality of blades 53 extending substantially radially with respect to the wheel. The back 52 is mounted on a hub 54 which is directly attached to shaft 50. The shaft 50 also carries a spur pinion 55 which meshes with a spur gear 56. This spur gear has attached to it a spur pinion 57. Pinion 57 and gear 56 are rotatably mounted upon a stub shaft 58 attached to the plate 42 through riveting as indicated at 59. The pinion 57 meshes with a gear 60 attached to another shaft 61. Shaft 61 extends through the two plates 41 and 42 and is journaled in the said plates. The upper end of the said shaft projects above the plate 41 and has attached to it a friction pinion 62. This pinion comprises a core 63 on which a short section of a rubber tube 64 is applied which tube is held in position on said core through a screw 65 threaded into said core. When the screw 65 is properly tightened, the tube 64 is held from movement and the pinion 62 functions in the desired manner.

Figure 4:
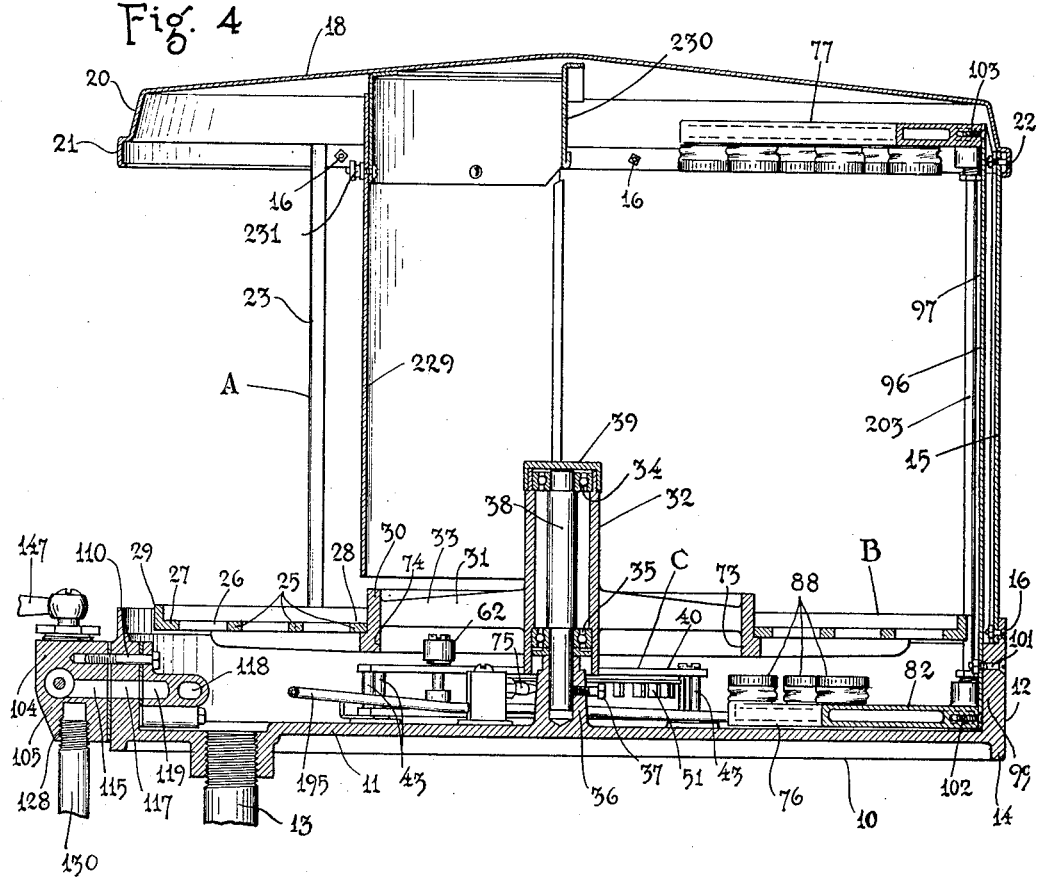
Fig. 4 is an elevational sectional view taken on line 4—4 of Fig. 3.

The frame 40 is mounted for swinging movement relative to the bottom 11 of tray 10 in the following manner: Extending through the two plates 41 and 42 is a bolt 66 which is reduced at one end and threaded as designated at 67. This bolt is screwed into a boss 68 formed on the bottom 11 and supports the entire frame for swinging movement clear of the bottom. The frame 40 is urged outwardly through a tension spring 69 which is attached at one end to the plate 42 and at its other end to an angle member 70 serving as a spring anchor. This angle member is attached to the bottom 11 through a number of screws 71 which are threaded into a boss 72 similar to the boss 68. The arms 33 of spider 31 are disposed toward the upper end of the flange 30 leaving the inner surface of said flange indicated at 73 unobstructed. The portion of the flange 30 having the surface 73 constitutes a friction gear with which the friction pinion 62 may engage. This gear is designated in its entirety by the reference numeral 74. From an inspection of Fig. 4 it will be noted that the pinion 62 is disposed at such an elevation as to engage the surface 73 of gear 74. Through the action of the spring 69 the pinion 62 is urged into frictional engagement with gear 74 and rotation of the rack B through the action of the water motor C is procured.

The water motor C further includes a nozzle 75 which is connected with a source of supply of water and which is attached to a mounting 276. The nozzle 75 is fixed in position and is adapted to direct a stream of water tangentially upon the blades 53 of the water wheel 51. This causes the wheel 51 to rotate and gear 62 is correspondingly rotated at a reduced rate of speed through the action of the intervening transmission elements including the various gears and pinions previously described. Due to the fact that the nozzle 75 is directly supported on the tray 11 a rigid pipe connection may be utilized for supplying water to the same and frame 40 on which the motor C is supported may swing freely to bring the pinion 62 into proper frictional engagement with its corresponding gear 74 without interference. This eliminates a flexible water pipe or connection leading up to the motor.

For the purpose of spraying water upon the glasses carried on rack B two spray units indicated at 76 and 77 are employed. Spray unit 76 is disposed below the rack B and spray unit 77 is situated above said rack. The spray unit 76 consists of an arcuate hollow manifold 78 which is constructed with three laterally extending branches 79, 80 and 81 and with a neck 82 near its center connected to said branches. In the middle of the neck 82 is provided a partition 83 which divides the said manifold in two parts, providing two separate chambers 86 and 87 within the interior of the manifold. At suitable localities on the manifold 78 and at the ends of the branches 79, 80 and 81 are provided spray nozzles 88 which are adapted to direct fine sprays of water upwardly for the purpose of washing the vessels placed upon the rack B from beneath said vessels.

The two spray units 76 and 77 are supported in the following manner: Attached to the rim 12 of tray 10 is an upright 96 formed of sheet metal which is bent to provide a back 97 and two outwardly extending flanges 98. This upright is bolted to a rectangular lug 99 formed on the said rim which projects inwardly into the pan 10. For this purpose a bolt 101 is employed which extends jointly through said lug, rim and upright. The flanges 98 engage this lug and hold the upright in proper position. Upright 96 serves to support both the lower and upper units 76 and 77. The lower unit 76 is threaded to receive a machine screw 102 which passes through the said back 97 of the upright 96 and which is screwed into unit 76. The unit 77 is similarly attached to the upper end of the upright 96 through another screw 103, which passes through the back 97 of said upright and which is threaded into the manifold thereof.

For the purpose of shutting off the hot and cold water to the sprays, a shut off valve mechanism 104 is employed which is mounted at the front of the tray 10. Upon the interior of the tray is provided a control valve 106, which is disposed directly opposite the valve mechanism 104. The valve mechanism 104 includes a valve housing 105 and the control valve 106 includes a housing 107. These two housings are attached to the rim 12 of tray 10 in the following manner: Upon the valve housing 107 are formed two lugs 108. Two cap screws 110 pass through these lugs and through a flattened portion 109 of the rim 12 and are threaded into the housing 105 of the valve mechanism 104.

The valve mechanism 104 may be of any desired construction and includes two valves, not shown, which are controlled by a single operating handle 147. Cold and hot water pipes 129 and 130 are connected to the valve mechanism 104.

The control valve 106 may be constructed in any suitable manner and includes a handle 163 by means of which hot or cold water may be furnished, as required. Attached to the control valve 106 is a pressure regulating valve 164 which communicates with the control valve 106 and which is provided with cold and hot water outlets 176 and 177. This valve may be of any suitable construction and is adapted to independently regulate the pressure of the cold and hot water.

For the purpose of leading water to the various nozzles, flexible tubes 195 and 196 are employed, which are connected to the two outlets 176 and 177 by tube connections 197 and 198. The tube 195 is directly connected to the motor nozzle 75. A branch tube 199 is also connected to the tube 195 and is connected to a connection 201 formed on the manifold 78 of the lower spray unit 76. This boss is so situated that tube 199 communicates with chamber 86 within the same. Tube 196 is similarly connected to a connection 202, formed on the said manifold by means of which said tube is brought into communication with the chamber 87 of said manifold. The two corresponding chambers of the upper manifold are connected to the chambers of the lower manifold through vertically extending tubes 203 and 204, which extend along the upright 96 and are protected and guarded thereby. In this manner water is delivered from the lower spray unit to the upper spray unit, hot water being provided on the right hand side, and cold water on the left hand side.

The operation of the invention is as follows: By turning handle 147 both hot and cold water are simultaneously delivered to the control valve 106. When the handle 163 thereof is in one position hot water is furnished to the tube 196 and cold water furnished to the tube 195. From tube 195 cold water is furnished to the nozzle 75. Water leaving this nozzle causes the wheel 51 to rotate, which sets in motion the train of gearing, causing the friction pinion 62 to rotate at a slow rate of speed. Through the action of spring 69 this pinion is urged against the friction gear 74, which causes the rack B to rotate in a counterclockwise direction as viewed in Fig. 3. Cold water at the same time passes through the pipes 199 and 202 and is discharged into the chambers 86 of the two sprays, units 76 and 77, and sprays upwardly and downwardly from the respective nozzles attached to the same. The hot water passes through tubes 196 and 204, to the chambers 87 of the spray units 76 and 77. This causes sprays to be directed upwardly and downwardly from the nozzles attached to said units. If now glasses are placed upon the rack B in inverted position, said glasses are caused to travel through the sprays and are washed both within and without. Inasmuch as glasses are frequently desired for immediate use, it becomes desirable to cool the same. Therefore, cold water sprays are used which chill the glasses before the same are removed from the rack. When the glasses appear opposite the opening in the housing A, the same may again be withdrawn. If the operator should fail to remove the glasses, no particular harm is done, as the glasses merely go through the machine a second time and are further cleansed.

Our invention is highly advantageous in that an extremely practical device is provided whereby drinking glasses and similar vessels may be quickly and easily washed. It is merely necessary to place the glasses upon the rack and when the same come out of the machine the glasses are perfectly clean and ready for use. The motor is designed for relatively low pressure, so that the device operates under pressures such as are available with ordinary municipal water systems. Once the device is installed the same will require practically no attention. By means of the friction gearing employed, no injury can be done to the device in the event that the rack is accidentally stopped. Furthermore, the operator may hold the rack if he so desires when the glasses come opposite the sprays to give them a little longer washing if found desirable. A single drain is used for the water discharged upon the glasses as well as from the motor, all of the water being led into the tray at the bottom of the device and carried away from the same through said drain. By the use of a water motor connections for electrical current are entirely eliminated. By means of the construction shown the entire frame carrying the motor and transmission may be shifted to bring the friction gearing in contact without affecting the operation of the motor. At the same time no complicated swinging pipe joints are required, since the motor nozzle is fixed relative to the housing.

Changes in the specific form of our invention, as herein disclosed, may be made within the scope of what is claimed without departing from the spirit of our invention.

Having described our invention, what we claim as new and desire to protect by Letters Patent is:

1. A driving means for machines for washing drinking vessels including a cylindrical housing having a bottom and a flat circular rack disposed in spaced relation above the bottom and arranged to rotate about a vertical axis, said driving means including a friction gear depending from said rack, a frame pivoted to swing with respect to said bottom about a vertical axis, a motor carried by said frame, gearing driven by said motor and carried by said frame, said gearing including a friction pinion cooperating with said friction gear, and movable toward and from said gear upon swinging of the frame, and resilient means for swinging the frame in a direction to urge the pinion into engagement with said gear.

2. A driving means for machines for washing drinking vessels including a cylindrical housing having a bottom and a flat circular rack disposed in spaced relation above the bottom and arranged to rotate about a vertical axis, said driving means including a friction gear depending from said rack, a frame pivoted to swing with respect to said bottom about a vertical axis, a water wheel journaled in said frame, gearing driven by said wheel and carried by said frame, said gearing including a friction pinion cooperating with said friction gear, and movable toward and from said gearing upon swinging of the frame, resilient means for swinging the frame in a direction to urge the pinion into engagement with said gear, and a nozzle fixed relative to said housing and directing a spray of water against said water wheel to procure rotation thereof, said nozzle being arranged to strike the water wheel at the operating position of the friction pinion.

3. A driving means for machines for washing drinking vessels including a cylindrical housing having a bottom and a flat circular rack disposed in spaced relation above the bottom and arranged to rotate about a vertical axis, said driving means including a frame consisting of upper and lower plates, means for holding said plates in spaced relation, a vertically disposed bolt attached to said bottom and extending through said plates at one end of the frame for supporting the frame for swinging movement, a depending flange formed on said rack and having an inner surface operating as a friction gear, a water wheel journaled between said plates near the pivoted end thereof, a shaft journaled near the other end of said frame, said shaft extending through the upper plate and having a friction pinion mounted thereon for engagement with said gear, a gearing between said water wheel and said shaft, said gearing being carried by said frame, resilient means for swinging said frame outwardly to cause said friction pinion to engage the friction gear and a nozzle attached to said housing and being adapted to direct a stream of water against said water wheel when the friction pinion is in engagement with the friction gear.

4. In a machine for washing drinking vessels, a housing having a relatively flat bottom, a flat circular rack disposed above said bottom and in close position with respect thereto to provide a shallow space therebetween, means for supporting said rack for rotation above the bottom of the housing, a frame comprising two spaced plates parallel with said rack and bottom, means for pivoting said frame for swinging movement about an axis parallel to the axis of the rack, a motor and transmission gearing carried by said frame, and means for driving said rack from said transmission gearing.

5. A driving device for a machine for washing drinking vessels comprising a support and a rack rotatably mounted on said support, said driving device including a friction gear for driving said rack, a frame, a pivot mounted on said support for pivotally supporting said frame, a power transmission carried by said frame and including a driving shaft and a driven friction pinion for engagement with said friction gear, a spring for swinging said frame to urge the friction pinion into engagement with said friction gear, said driving shaft being positioned in proximity to said pivot, a water wheel attached to said driving shaft and a nozzle attached to said support and fixed relative thereto for directing a stream of water against said water wheel.

6. A driving means for a machine for washing drinking vessels including a cylindrical housing having a bottom and a flat circular rack disposed in spaced relation above the bottom and arranged to rotate about a vertical axis, said driving means including a friction gear depending from said rack, a frame pivoted to swing with respect to said bottom about a vertical axis, a water wheel journaled in said frame, gearing driven by said wheel and carried by said frame, said gearing including a friction pinion cooperating with said friction gear, and movable toward and from said bearing upon swinging of the frame, resilient means for swinging the frame in a direction to urge the pinion into engagement with said gear, and a nozzle fixed relative to said housing and directing a spray of water against said water wheel to procure rotation thereof, said nozzle being arranged to strike the water wheel at the operating position of the friction pinion, said frame, spring, gearing, water wheel, and nozzle being all confined to the space between said bottom and rack.

7. In a machine for washing drinking vessels, a cylindrical housing having a bottom, a flat circular rack disposed above said bottom to provide a shallow space therebetween, means for detachably supporting said rack for rotation above said bottom, whereby the rack may be removed to give access to said space, a frame disposed within said space and consisting of upper and lower plates, means for holding said plates in spaced relation, a vertically disposed pintle attached to said bottom and extending through said plates at one end of the frame for supporting the frame for swinging movement, a depending flange formed on said rack and having an inner surface operating as a friction gear, a water wheel journaled between said plates near the pivoted end thereof, a shaft journaled in said plates near the other ends thereof, said shaft extending through the upper plate and having a friction pinion mounted thereon for engagement with said gear, gearing between said water wheel and said shaft, said gearing being carried by said frame, a coil spring disposed in said space and connected at one end to said frame and at its other end to said bottom and swinging said frame to urge the friction pinion into engagement with said friction gear, and a nozzle fixedly attached to said bottom and free from said water wheel, said nozzle being disposed within said space and directing a stream of water against said water wheel.

WALTER F. OHME.
RAY C. STEPHAN.